United States Patent [19]

Williams

[11] Patent Number: 5,115,766
[45] Date of Patent: May 26, 1992

[54] DISPOSABLE LITTER BOX

[76] Inventor: Ruth L. Williams, 2842 Kingswood, Garland, Tex. 75040

[21] Appl. No.: 645,556

[22] Filed: Jan. 24, 1991

[51] Int. Cl.⁵ .............................................. A01K 67/00
[52] U.S. Cl. ................................................... 119/168
[58] Field of Search ............... 119/161, 165, 168, 169, 119/170; 220/402, 404, 408

[56] References Cited

U.S. PATENT DOCUMENTS

| | | | |
|---|---|---|---|
| 3,990,396 | 11/1976 | Turk | 119/170 |
| 4,014,292 | 3/1977 | Coughlin et al. | 119/1 |
| 4,305,544 | 12/1981 | Noonan | 229/33 |
| 4,624,380 | 11/1986 | Wernette | 119/168 |
| 4,628,863 | 12/1986 | Eichenauer | 119/1 |
| 4,715,320 | 12/1987 | Barnhart | 119/1 |
| 4,784,083 | 11/1988 | Kiel | 119/165 |
| 4,807,563 | 2/1989 | Berry et al. | 119/168 |
| 4,813,376 | 3/1989 | Kaufman et al. | 119/168 |
| 4,846,105 | 7/1989 | Caldwell | 119/168 |
| 4,872,420 | 10/1989 | Shepard | 119/1 |
| 4,913,091 | 4/1990 | O'Connor | 119/168 X |
| 4,932,360 | 6/1990 | O'Connor | 119/168 |

Primary Examiner—Gene Mancene
Assistant Examiner—Thomas Price
Attorney, Agent, or Firm—John F. Bryan, Jr.

[57] ABSTRACT

A pet animal excrement absorbing, disposable litter material container for placement of a supporting surface comprises a foldable side-wall structure without inherent leakage sealing characteristics and employs an impermeable membranous sheet as a barrier seal as well as for disposal of excrement and contaminated litter material. A rectangularly erect assembled state is maintained through balanced folding moment forces at each corner or by folding stiffening panels having squared ends which fit inside of adjacent side-wall sections. The components all fold to make a flat package for commercial distribution.

20 Claims, 8 Drawing Sheets

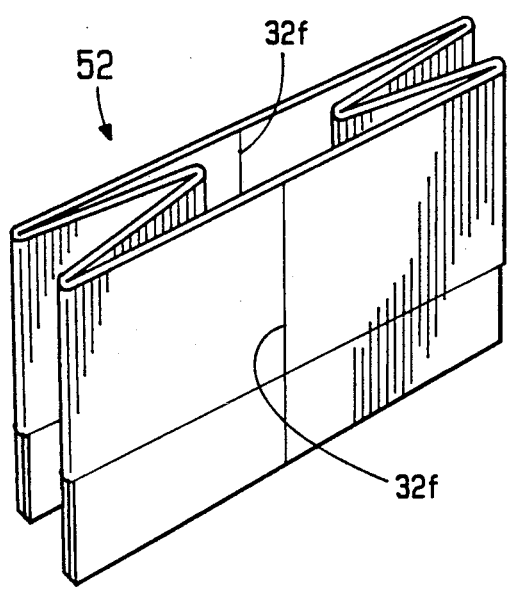
FIG. 11
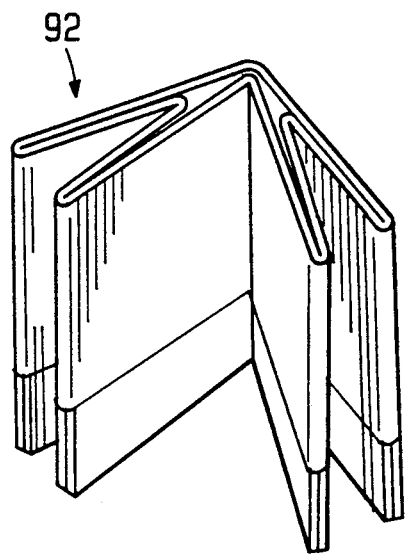
FIG. 12
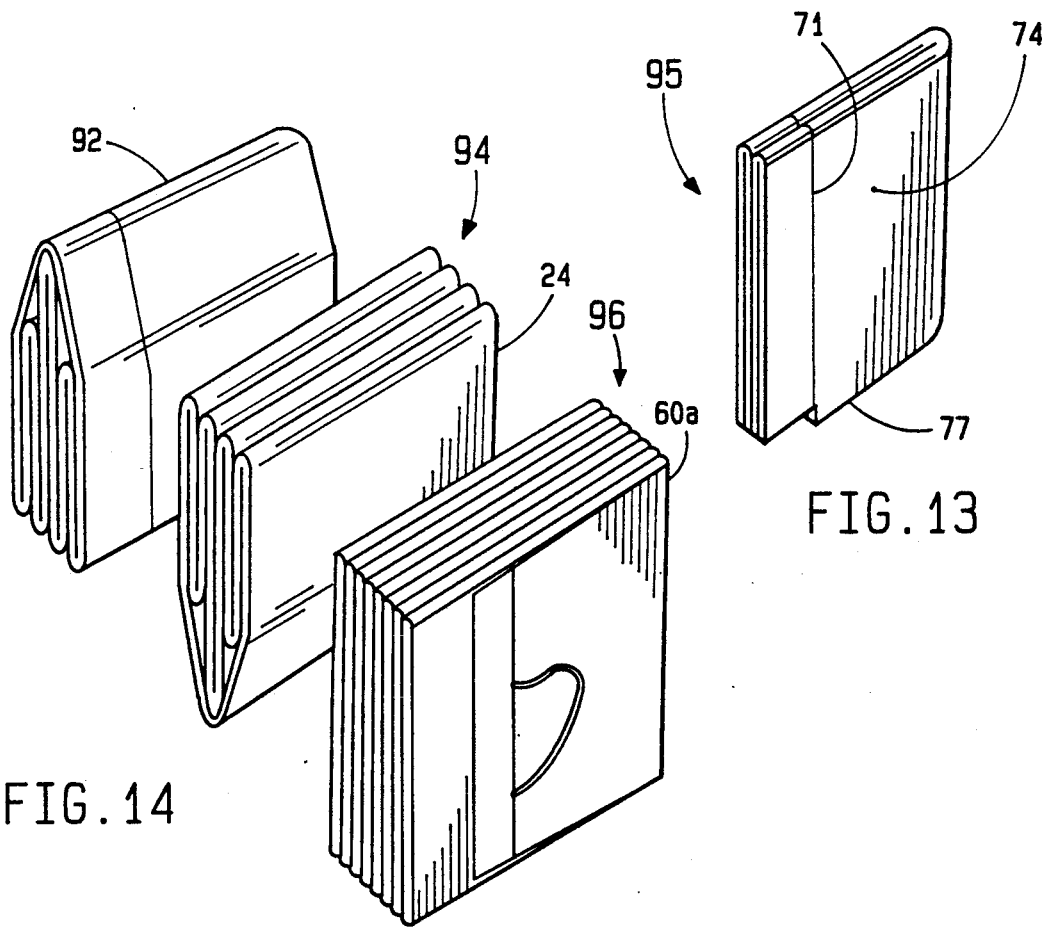
FIG. 13
FIG. 14

DISPOSABLE LITTER BOX

TECHNICAL FIELD

The present invention relates to the field of collapsable litter containers for pets, in a form specifically adapted to be packaged for distribution and marketing, wherein an impermeable membranous sheet both protects against leakage and serves as packaging for disposal of contamination.

BACKGROUND AND SUMMARY OF THE INVENTION

Owners of small pets commonly provide indoor litter boxes to receive and hold animal excrement for later disposal. These litter boxes are most frequently used for cats, but are suitable for any domestic animal which, by natural inclination or training, is amenable to the discipline of voiding in a designated area. A container of suitable size made of plastic, metal or cardboard, and having a surrounding side-wall, is kept in a chosen location suited to the household. It is filled to a depth of 2" or "3" with a cellulose or absorbent clay material, or with a commercial litter material which includes a deodorizing agent. The side-wall should be high enough to keep the litter in the container during any pawing and scratching that goes with its use.

The litter material is rearranged periodically and those faces which can be picked up with a small scoop are removed for disposal. After a few days, perhaps a week, the litter material becomes saturated, or its deodorizing agent becomes ineffective, so that it must be disposed of and replaced with fresh material. This duty is probably the most distasteful part of pet care for an owner. Moreover, there are known health hazards such as toxoplasmosis, in handling of such wastes, most particularly for pregnant women. A reusable litter box adds to these onerous duties, since it too must be periodically cleaned. Newspaper is frequently used as a lining material, and to also serve as a protective floor cover under and around the litter box. When the same location is used for years, as is often the case, damage caused by leakage underlines the need for more positive protective covering.

Small pets, and especially cats, are wonderful traveling companions except for the awkard logistics of the litter box. Also, the overt indelicacy of greeting one's host with a lovely pet on one arm and a litter box under the other is discomfitting at best.

Thus, there is a long recognized need for a fully sanitary, disposable and transportable litter box for pets. It follows logically that such a litter box is potentially popular and profitable if proper cost and distribution dynamics are in place. To achieve good sales volume, this sort of product must be inexpensive and packaged for market distribution. U.S. Pat. No. 3,626,900 discloses a flexible sheet with a peripherial drawstring. This sheet is laid on a flat surface to receive excrement, and the drawstring then facilitates its sanitary disposal, but the use of any litter material, or a means for its confinement are not disclosed. Some of the desired features are also disclosed in U.S. Pat. No. 4,913,091, wherein an assembly of parts provides a relatively inexpensive and light weight litter box. The vital aspect of commercial packaging for sales and distribution is not contemplated, even in this recent effort.

A first object of the invention is therefor, to provide an economical, disposable alternative, thereby eliminating the unpleasant maintenance of a reusable litter box. Another object is to provide an impermeable protective cover for the floor under and around this disposable litter box as well as a sanitary enclosure for the disposal of the waste. A further object is to make this litter box in a compact, flat packageable form for both commercial distribution and use while traveling, without any sacrifice of functional strength or rigidity.

The availability of an inexpensive device meeting these objectives can alter the present usage pattern by making it practical to use only a shallow layer of litter material and dispose of it each day or two.

The present invention provides a litter box having rigid side-walls wherein the component parts fold into a compact form suitable for commercial packaging. A flexible sheet, which may have a peripheral drawstring, serves as an impermeable membranous seal and also as the disposal means. An arrangement of folding portions open to form the side-walls when erected. When unfolded in a rectangularly arranged, upright shape in the absence of an integral bottom panel, the side-walls are stiffened by folded stiffeners which lie flat against the supporting surface, and may extend either into or away from the interior of the rectangle.

The flexible sheet, which may be in either flat or bag form, is fitted as a liner into the interior of the rectangle, and is drawn down around the exterior of the side-walls. If desired, an unsealed bottom reinforcing panel may be included under this impermeable membraneous sheet to maintain the rectangular shape, and a side support outer wall may be fitted over the erect side-walls to provide additional rigidity and to help hold the flexible sheet in place.

DESCRIPTION OF THE DRAWINGS

The aforementioned and other objects and features of the invention will be apparent from the following detailed description of specific embodiments thereof, when read in conjunction with the accompanying drawings, in which:

FIG. 11 is a view of a manner of folding a side-wall or side support assembly for packaging;

FIG. 12 is a view of a second manner of folding a side-wall or side support assembly for packaging.

FIG. 13 is a view of a manner of folding a bottom section for packaging;

FIG. 14 is a view of a third arrangement for packaging of a first preferred embodiment for commercial distribution.

DETAILED DESCRIPTION OF THE INVENTION

Figure 1:
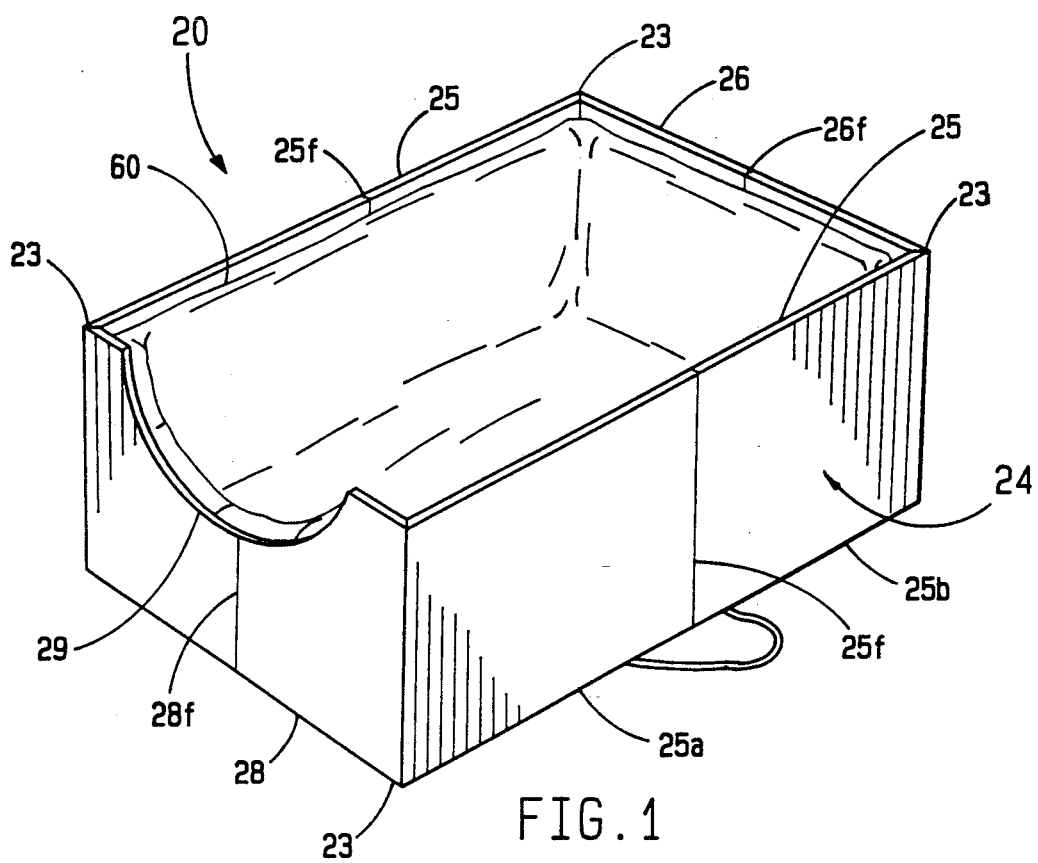
FIG. 1 is a view of a first preferred embodiment of the invention as erected, with foldable side support means.
Figure 2:
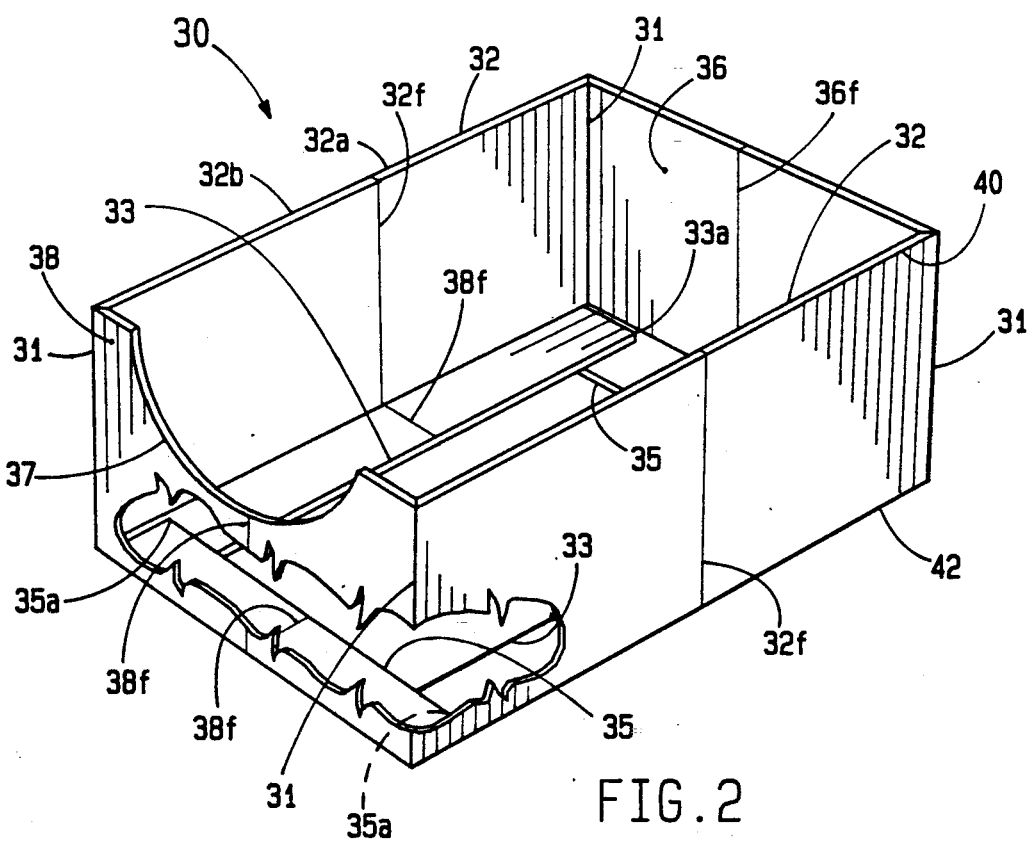
FIG. 2 is view of the erected side-wall assembly of the first preferred embodiment with lower panels folded inwardly.

Referring now to FIG. 1 of the drawings, there is shown a litter box assembly 20, the first preferred embodiment of the present invention. The periphery of an impermeable membraneous sheet 60 is confined by continuous, foldable side support assembly 24. This sheet 60 is fitted inside of, and drawn down over, a continuous side-wall assembly 30, which is hidden in FIG. 1, but is clearly shown in FIG. 2. Fold lines 25f—25f extend across opposed longitudinal side-wall sections 25—25 of side support assembly 24, dividing each into two parallel folding panels 25a and 25b and in the same manner, fold lines 26f-28f extend across the opposed transverse side-wall section 26 and 28. Transverse side-wall section 26 and 28 differ only to the extent of the optional height reducing cut-out 29, allowing easier access by the pet. Side support assembly 24 is urged to assume and maintain a rectangular state by balancing the forces of folding moments across the four corners 23—23. The side support assembly 24 can be made from heavy corrugated box material so that it can carry heavy vertical edge loading, making it possible to use light weight material for the side-wall assembly 30. The side support assembly 24 also allows the use of a loosely fitted impermeable membranous sheet 60 by keeping any free folds neatly in place and also helps to maintain the rectangular shape of the erected litter box assembly 20. Clearly however, if side-wall assembly 30 is made from heavier material, and if impermeable membraneous sheet 60 is more closely fitted, side support assembly 24 is not needed. The optional height reducing cut-outs 29 and 37 permit greater side-wall assembly height for better confinement of litter material. FIG. 2 shows the foldable, continuous side-wall assembly 30 in the unfolded and rectangularly erect state and further shows that said assembly is not inherently impermeable to leakage. The fold lines 32f—32f extend from side-wall upper limit 40, across opposed longitudinal sides 32—32, dividing each into two panels, 32a and 32b through side-wall lower limit 42 and across stiffeners 33—33. In the same manner, fold lines 36f-38f extend across the opposed transverse sides 36 and 38, dividing each into two panels, through side-wall lower limit 42, and across stiffeners 35—35. Transverse sides 36 and 38 differ only to the extent of the height reducing cut-out 37.

In the absence of an integral, sealed bottom panel, the open, unfolded condition of sides 32, 36 and 38 is enforced by the angular relationship of stiffeners 33—33 and 35—35 respectively, which are folded toward the interior of side-wall assembly 30. Side-wall assembly 30 is urged to assume and maintain a rectangular state through balancing of the folding forces across the four corners 31—31. Moreover, the square-cut ends 33a of stiffener 33, or 35a of 35, depending upon folding sequence, will bear against the inner surfaces of side-wall assembly 30 so as to also maintain the rectangular state.

Figure 3:
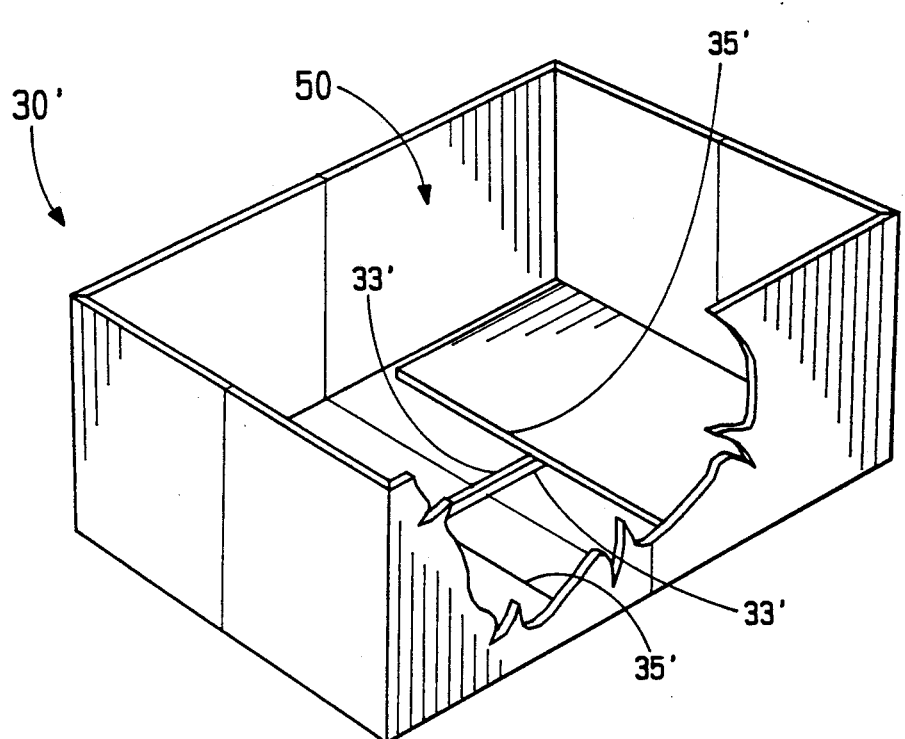
FIG. 3 is view of the erected side-wall assembly of FIG. 2 with lower panels of extended length.
Figure 4:
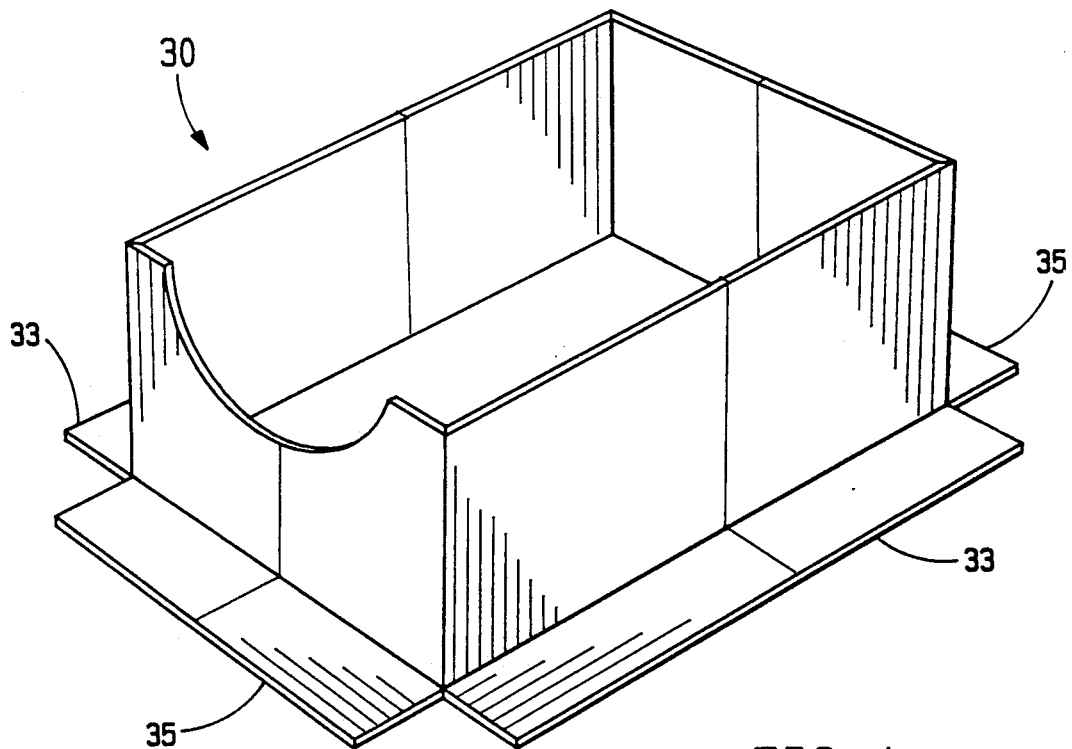
FIG. 4 is view of the erected side-wall assembly of the first preferred embodiment with lower panels folded outwardly.

Referring to FIG. 3, there is shown a similar side-wall assembly 30', differing from side-wall assembly 30 only to the extent that stiffeners 33'—33' and 35'—35' are extended to more or less completely cover, but still not seal, the bottom area 50. FIG. 4 shows an alternate form of the unfolded and rectangularly erect state of side-wall assembly 30, differing from FIG. 2 only in that stiffeners 33—33 and 35—35 are now folded outwardly.

Figure 5:
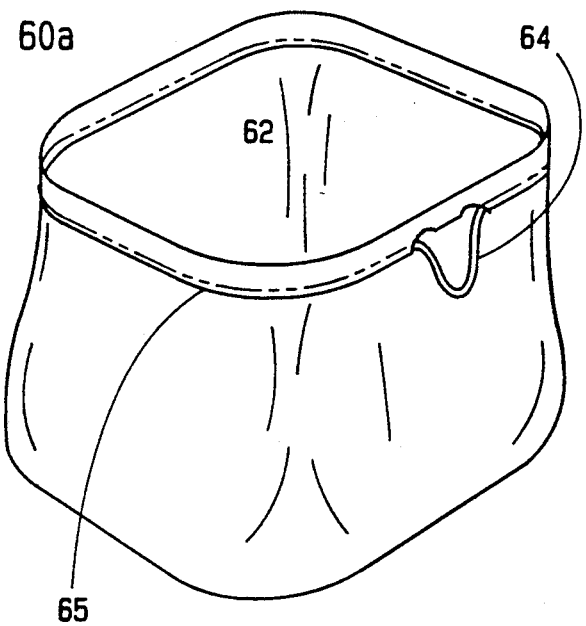
FIG. 5 is a view of a preferred sheet plastic bag usable with any embodiment of the present invention.
Figure 6:
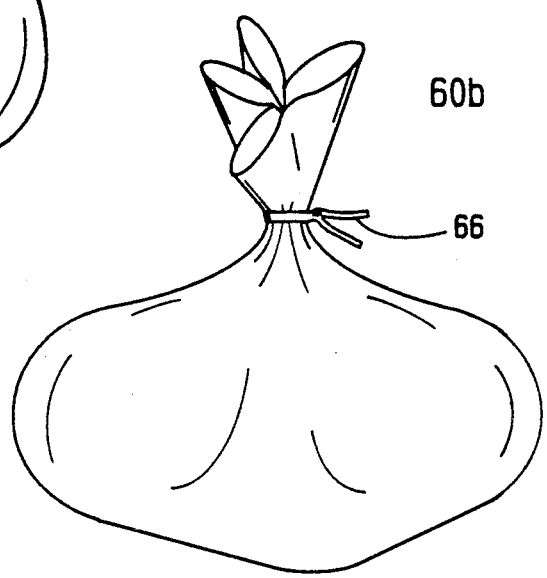
FIG. 6 is a view of an alternate sheet plastic bag which may be used interchangeably with the preferred bag.
Figure 7:
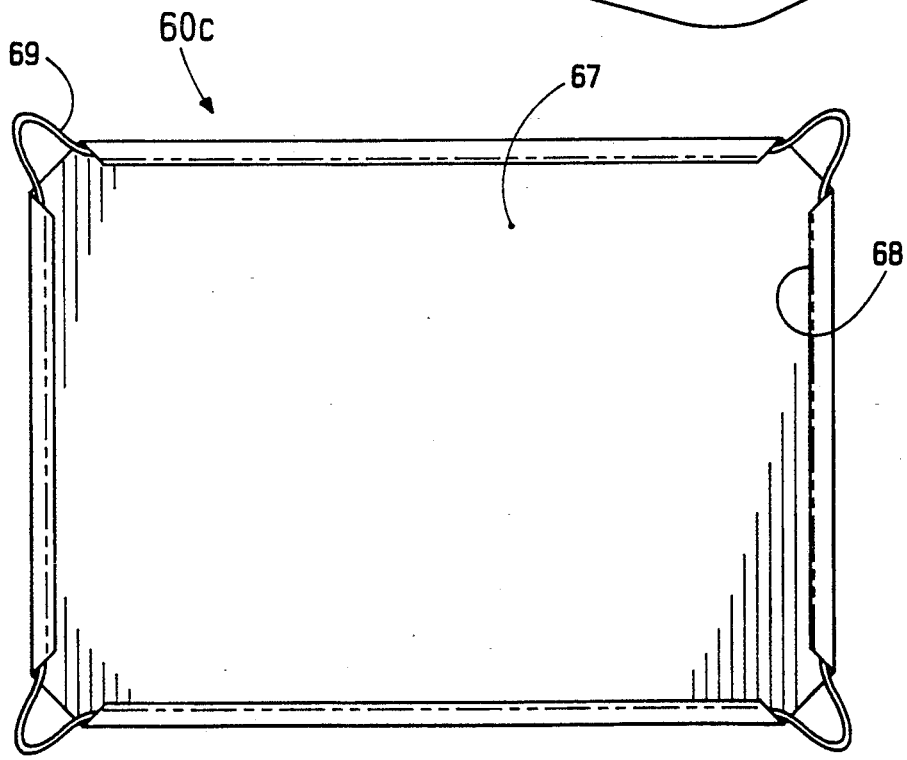
FIG. 7 is a view of a plastic sheet which may be used interchangeably with the preferred bag.

FIGS. 5, 6 and show alternate forms of the foldable impermeable sheet means 60 of FIG. 1. The bag 60a of FIG. 5, made from 0.002" to 0.004" thick high density polyethylene film is a preferred form. Although other materials may be used, the polyethylene is favored for reasons of availability, cost and ease of manufacture. The bag 60a is of a rectangular shape having longitudinal dimension 61 and transverse dimension 62, conforming to the dimensions of side-wall assembly 30, and a height 63 for fitting with side-wall assembly 30 as shown in FIG. 1. A drawstring 64 runs through the hem 65 for closure and disposal of the bag 60a. The plastic bag 60b, as shown in FIG. 6 differs from bag 60a only in the omission of drawstring 64 and hem 65, and is gathered and closed by a twisted tie 66. The foldable impermeable sheet 60 need not take a bag-like form but, may be a flat plastic sheet 60c as is shown in FIG. 7. There is shown a plastic sheet 67, made of the preferred high density polyethylene and again, other materials are suitable. Hem 68 borders sheet 67, confining drawstring 69, so that the periphery there of sheet 67 may be gathered and held together for waste disposal.

In commercial distribution, packaging of the invention in a minimal volume reduces shipping cost as well as the risk of in-transit damage and facilitates shelf display, all highly desirable attributes. In order to achieve this end each component must fold into a flattened shape as is shown in FIGS. 8, 9 and 14.

Figure 8:
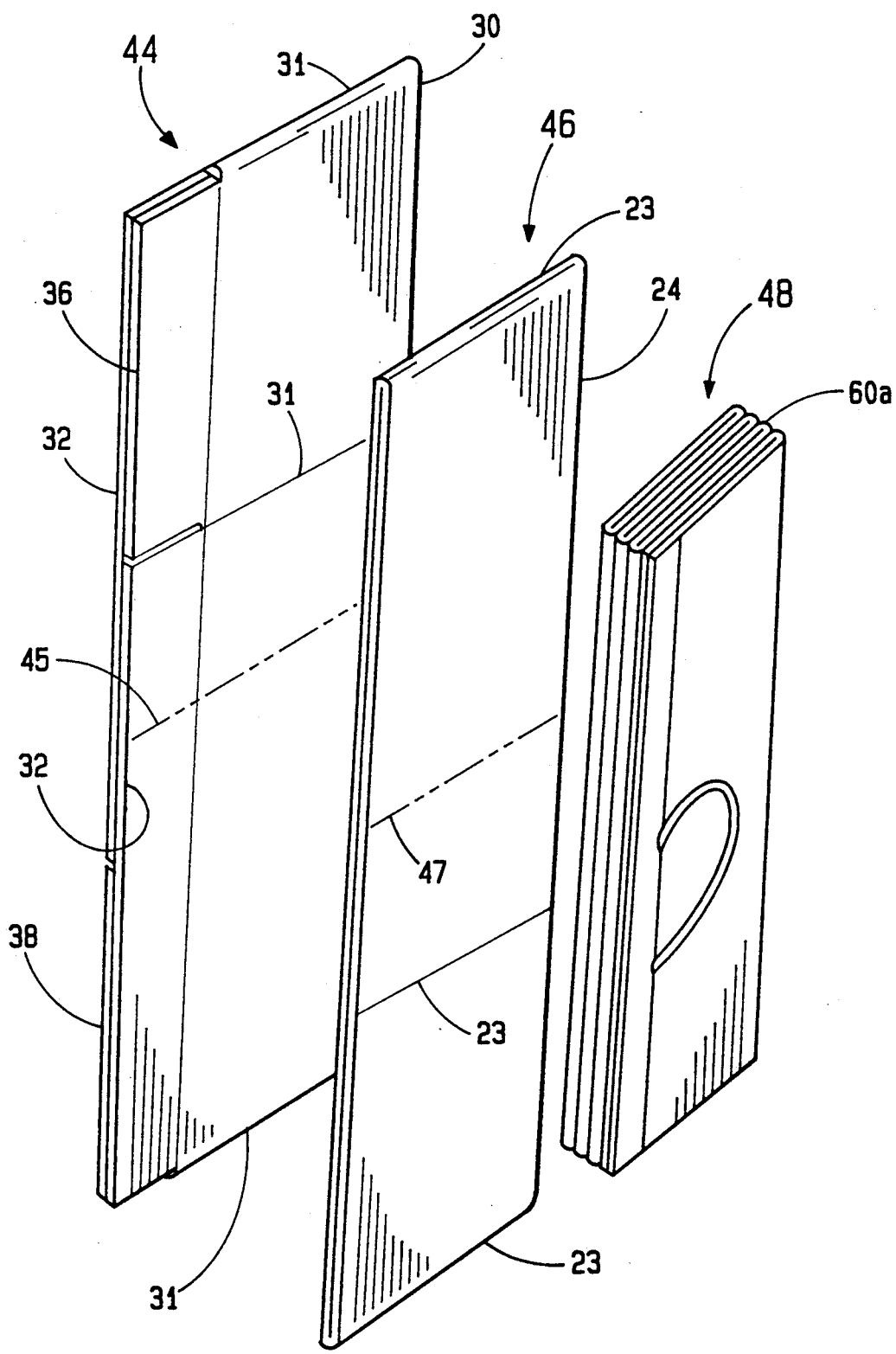
FIG. 8 is a view of an arrangement for packaging of a first preferred embodiment for commercial distribution.

FIG. 8 shows the side-wall assembly 30 folded at diagonally opposite corners 31—31 to achieve flattened shape 44 without folding of longitudinal sides 32—32 or transverse sides 36 and 38. Side support 24 is folded in a similar manner, to flattened shape 46. It should be noted that, in order to produce the balance of folding moment forces desired to urge and maintain the rectangular shape as mentioned previously, the folded corners 23 and 31 should be staggered when the assembly of FIG. 8 is erected. A useful multiple set of plastic bags 60a are folded and stacked in flattened shape 48 and these shapes 44, 46 and 48 are then ready for packaging together in a carton, or in "shrink wrap" plastic, as is widely practiced. A package of reduced overall dimensions can be readily made, if so desired, by additionally folding the flattened shapes 44 and 46 along fold lines 45 and 47 respectively.

Figure 9:
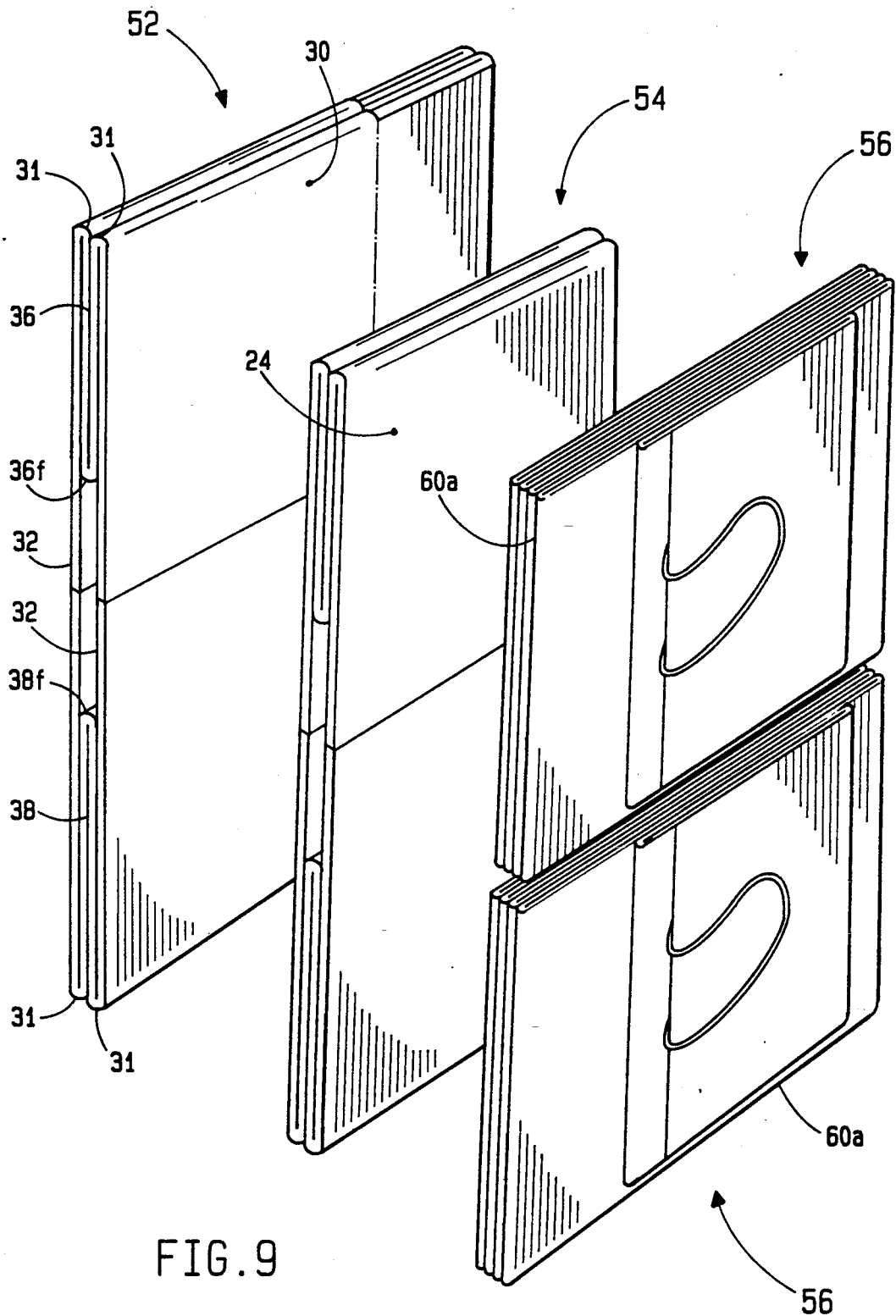
FIG. 9 is a view of a second arrangement for packaging of a first preferred embodiment for commercial distribution.

In FIG. 9 is shown the side-wall assembly 30 as an alternate flattened shape 52, made by folding transverse sides 36 and 38 along fold lines 36f and 38f, so as to also fold inwardly at corners 31—31. Side support 24 is folded in a similar manner to flattened shape 54, and multiple sets of plastic bags 60a are folded and stacked in flattened shapes 56—56. These flattened shapes 52, 54 and 56—56 are then ready for final packaging in the above described manner.

Figure 10:
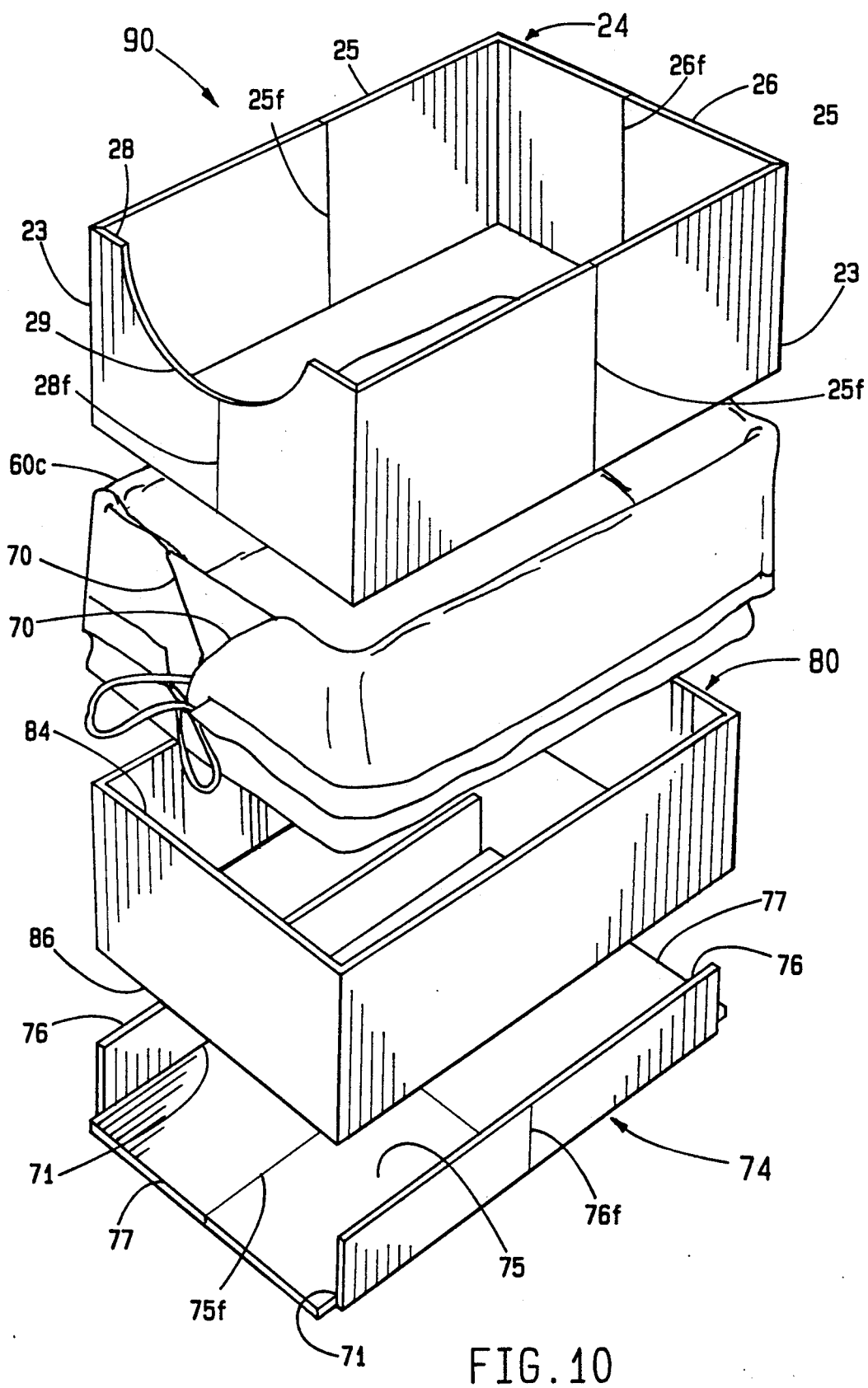
FIG. 10 is an exploded view of a second preferred embodiment of the invention comprising a separate bottom section.

Referring now to FIG. 10, a second litter box assembly 90 is shown in an exploded view as a second preferred embodiment of the invention. Here, the side support assembly 24 may be the same as used for the first litter box assembly 20, and the same foldable plastic bag 60a may be used. The foldable flat plastic sheet 60c is shown in this instance to demonstrate its application. A second side-wall assembly 80 is shown, with upper limit 84 and lower limit 86 but without an equivalent of the stiffeners 33 or 35 of side-wall assembly 30. The foldable flat sheet 60c is arranged to fit closely inside of, over and around side-wall assembly 80 by making the bias folds 70, and side support assembly 24 holds these folds 70 in place. Bottom 74 comprises foldable bottom section 75 with opposed stiffeners 76—76 which fold upwardly along fold lines 71—71, to stiffen foldable bottom section 75 along fold line 76f. The stiffeners 76—76 fit closely inside of side-wall assembly 80 so as to retain said folded relationship to bottom section 75 and to also urge and maintain rectangularity of side-wall assembly 80. The lower limit 86 of Side-wall assembly 80 rests on extended edges 77—77 of bottom section 75 so as to prevent folding thereof along fold line 75f.

FIG. 11 and 12 illustrate how the flattened shape 52 of FIG. 9 may be further reduced in overall dimension by an additional fold along fold lines 32f—32f giving the flattened shape 92 of FIG. 12. FIG. 13 shows the manner of folding bottom 74 of FIG. 10, into a flat shape 95 for packaging.

FIG. 14 shows the compact flattened shape 92, a side support assembly 24 similarly folded to comprise similar shape 94, and a multiple set of bags 60a—60a are arranged for packaging together in a carton, or in "shrink wrap" plastic as previously described.

Figure 15:
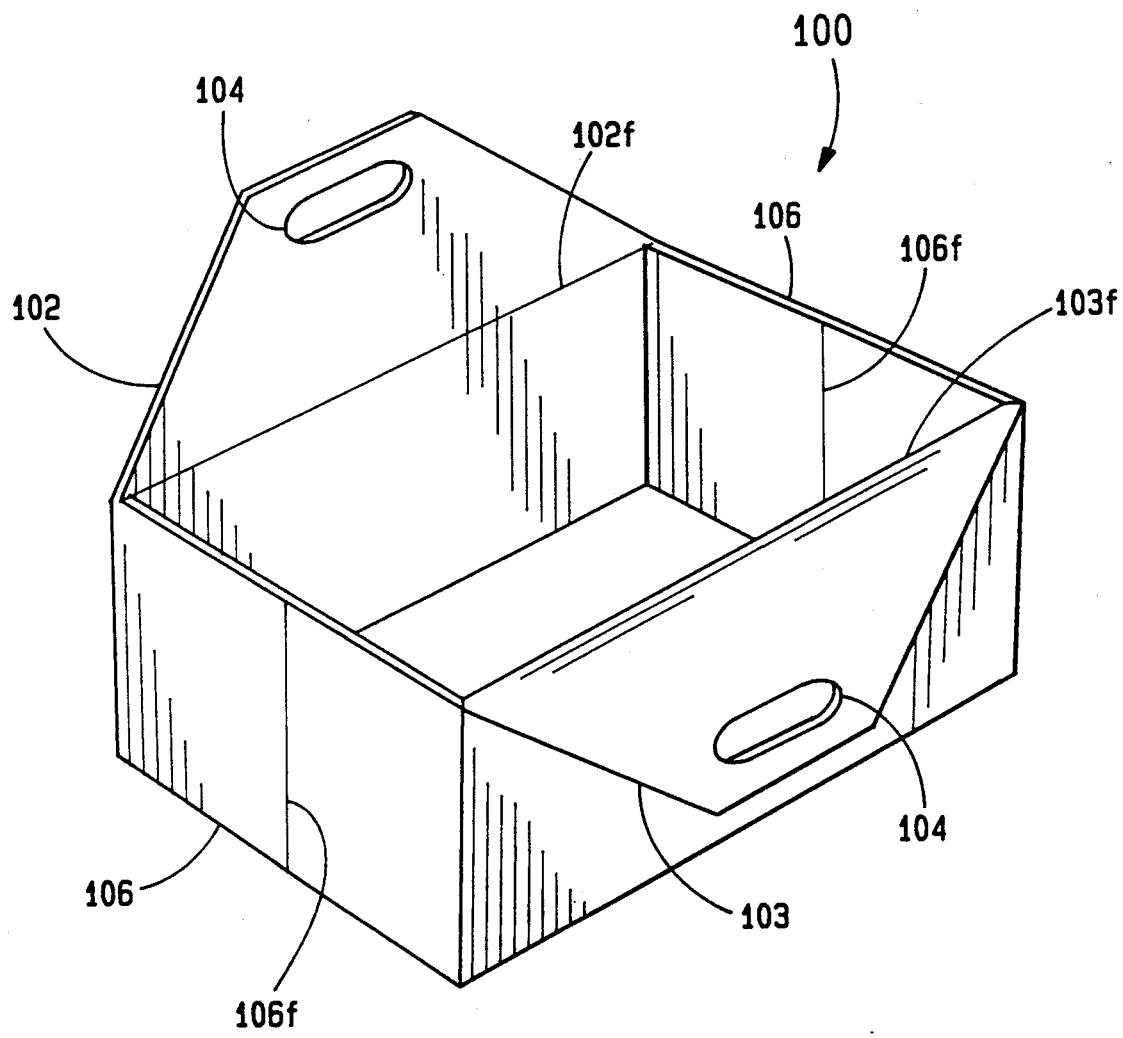
FIG. 15 is a view showing an alternate side support which provides hand holes to facilitate handling.

In FIG. 15 is shown an alternate embodiment of a side support assembly 100 which may be used interchangeably with side support 24. Side support assembly 100 includes upper panels 102 and 103, with panel 102 shown in the erect state as when assembled for use, and panel 103 shown folded along upper fold line 103f as for flat packaging. Handles 104—104, provided by cut-outs in panels 102 and 103, are elevated in the erect position so as to facilitate placing and removing side support assembly for maintenance. Flat packaging is accomplished in a manner similar to that shown in FIG. 9, by folding sides 106—106 inwardly along fold lines 106f—106f and also folding upper panel 102 along fold line 102f as 103 is shown to be.

It will be understood that the invention is not limited to the disclosed embodiments, but is capable of rearrangement, modification and substitution of parts and elements without departing from the spirit of the invention.

I claim:

1. A container for disposal of pet animal excrement for placement on a supporting surface comprising:
    disposable litter material;
    foldable side-wall means, having continuous upper and lower limits, for rectangularly vertically surrounding and unsealed confinement of said litter material when erected on said supporting surface, and for flat packaging when so folded;
    means for urging and maintaining the rectangularity of said foldable side-wall means when erected on said supporting surface; and,
    impermeable membranous means for containing and sealing under and around said litter material against leakage and providing a bottom positioned on said supporting surface, said membraneous means extending beyond said side-wall means so that the periphery of said membraneous means may be gathered for enclosing and disposing of excrement and litter material within said foldable side-wall means.

2. A container for disposal of pet animal excrement in accordance with claim 1, wherein said imperable membranous means further comprises:
    a foldable flat plastic sheet of a size to fit inside of, over and around said side-wall means in an unfolded and erect condition and providing an impermeable seal under and around said litter material when so fitted; and,
    gathering means for gathering the periphery of said plastic sheet to facilitate enclosing and disposing of excrement and contaminated litter materials.

3. A container for disposal of pet animal excrement in accordance with claim 1, wherein said impermeable membranous means further comprises:
    a foldable sheet plastic bag of size and form to fit closely inside of and around said foldable side-wall means in the rectangularly erect state, and of a depth exceeding the height of said side-wall means, so as to support said litter material when fitted within said side-wall means and extended up through the interior thereof; and,
    gathering means for closing the opening of said plastic bag to facilitate enclosing and disposing of excrement and contaminated litter materials.

4. A container for disposal of pet animal excrement in accordance with claim 1 further comprising:
    a foldable side support assembly fitting over said side-wall means in said rectangularly erect condition for reinforcement thereof and for confining an extended portion of said impermeable membranous means therebetween; and
    folding means for flat packaging of said side support assembly when so folded.

5. A container for disposal of pet animal excrement in accordance with claim 4 wherein said means for urging and maintaining rectangularity further comprises:
    an outer vertical fold at each corner of said rectangularly erect side support assembly having a corner folding force;
    an inner vertical fold at each corner of said rectangularly erect side-wall assembly having a corner folding force; and
    a symmetrical balance of the sums of said inner and outer corner folding forces at each corner in a rectangularly erect assembly of said side-wall assembly with said side support assembly.

6. A container for disposal of pet animal excrement in accordance with claim 4 wherein said side support assembly further comprises:
    first and second pairs of opposed side sections of equal height sufficient to confine said impermeable membranous means;
    a pair of upper panels adjacent said first opposed side sections and extending above the height of said second side sections;
    a cut-out opening in each said upper panel so as to facilitate handling of said side support assembly; and
    folding means for flat packaging of said side support assembly.

7. A container for disposal of pet animal excrement in accordance with claim 1 wherein said foldable side-wall means further comprises:
    a side-wall assembly having at least two opposed side-wall sections, each said section having first and second parallel folding panels; and folding means for flat packaging of said side-wall sections so that said first parallel panels are superimposed when so folded.

8. A container for disposal of pet animal excrement in accordance with claim 1 wherein said foldable side-wall means further comprises:
two opposed longitudinal side-wall sections, each having a set of two folding parallel panels;
two opposed transverse side-wall sections, each having a set of two folding parallel panels, joined with said longitudinal wall sections to comprise a continuous side-wall assembly; and
folding means for compact flat packaging of said side-wall assembly so that said sets of parallel panels of a least two said opposed side-wall sections are folded.

9. A container for disposal of pet animal excrement in accordance with claim 1 wherein said foldable side-wall means further comprises:
two opposed side-wall sections having a plurality of foldable panels and forming part of a continuous retangular side wall assembly in an erect state; and
stiffening means adjacent said continuous lower limit of said opposed side-wall sections for enforcing an unfolded condition thereof when disposed to lie against said supporting surface.

10. A container for disposal of pet animal excrement in accordance with claim 9 wherein said stiffening means comprises:
stiffening panels foldable along said continuous lower limit and spanning the fold line of said foldable side-wall panels so as to stiffen said fold line when flat against said supporting surface in the rectangularly erect condition and lie in plane with said side-wall sections when folded along said fold line.

11. A container for disposal of pet animal excrement in accordance with claim 9 wherein said means for urging and maintaining rectangularity further comprises:
a panel foldable along said continuous lower limit and having rectangularly square ends which engage the interior of said side-wall assembly so as to urge and maintain a rectangular state thereof when flat against said supporting surface in the erect condition of said side-wall assembly and lying against said side-wall section when folded.

12. A container for disposal of pet animal excrement in accordance with claim 1 wherein said means for urging and maintaining rectangularity further comprises:
two opposed side-wall sections having a plurality of panels and forming part of the continuous rectangular side-wall assembly in an erect state; and
opposed side-wall section folding means for flat packaging when folded and symmetrically balanced corner folding forces in a rectangularly erect state.

13. A container for disposal of pet animal excrement for placement on a supporting surface comprising:
disposable litter material;
a foldable side-wall assembly having continuous upper and lower limits providing a plurality of folding parallel panels so as to be rectangularly vertically surrounding said litter material when in an erect state;
folding means for flat packaging said side-wall assembly so that at least two pairs of adjacent parallel panels are folded against one another; separately foldable bottom means for supporting said litter material and for maintaining rectangularity of said side-wall assembly; and
impermeable membranous means for containing and sealing under and around said litter material, the periphery of said impermeable membraneous means extending beyond said side-wall assembly so that said periphery may be gathered for enclosing and disposing of excrement and contaminated litter materials.

14. A container for disposal of pet animal excrement according to claim 13 wherein said bottom means further comprises:
a foldable bottom section having at least two folding parallel panels with folding stiffeners at opposite edges of said bottom section and spanning the fold line of said parallel panels so that upon fitting said unfolded bottom section into said side-wall assembly at said lower limit thereof, said folded stiffeners fold against opposing inner side-walls and fit closely inside of said side-wall assembly.

15. A container for disposal of pet animal excrement according to claim 13 wherein said impermeable membranous means further comprises:
a foldable flat plastic sheet of a size to fit inside of, over and around said foldable side-wall assembly in a rectangularly erect condition so as to support said litter material; and
gathering means for gathering the periphery of said plastic sheet so as to enclose excrement and contaminated litter materials and facilitate disposal thereof.

16. A container for disposal of pet animal excrement according to claim 13 wherein said impermeable membranous means further comprises:
a foldable sheet plastic bag of size and form to fit closely inside of and around said foldable side-wall means in a rectangularly erect state, and of a depth exceeding the height of said-wall means, so as to support said litter material when fitted within said side-wall assembly and extended up through the interior thereof; and
gathering means for closing the opening of said plastic bag to facilitate enclosing and disposing of excrement and contaminated litter materials.

17. A container for disposal of pet animal excrement according to claim 13 further comprising:
foldable side support means fitting over said side-wall assembly in said rectangularly erect condition for reinforcement thereof and for confining an extended portion of said impermeable membranous means therebetween.

18. A container for disposal of pet animal excrement in accordance with claim 17 wherein said foldable side support means further comprises:
a foldable side support assembly fitting over said side-wall means and having at least two opposed side sections, each said section having first second parallel folding panels; and
folding means for list packaging of said side support assembly so that said first and second parallel panels are folded.

19. A container for disposal of pet animal excrement in accordance with claim 17 wherein said foldable side support means further comprises;
first and second pairs of opposed side sections of equal height sufficient to confine said impermeable membranous sheet means;

a pair of upper panels adjacent said first opposed side sections and extending above the height of said second side sections;

a cut-out opening in each said upper panel to facilitate handling of said side support assembly; and folding means for flat packaging of said side support assembly so that said upper panels are superimposed over said first panels when so folded.

20. A container for disposal of pet animal excrement in accordance with claim 17 wherein said foldable side support means further comprises;

first and second pairs of opposed side sections of equal height sufficient to confine said impermeable membranous sheet means;

a pair of upper panels adjacent said first opposed side sections and extending above the height of said side sections;

a cut-out opening in each said upper panel to facilitate handling of said side support assembly; and folding means for flat packaging of said side support assembly.

* * * * *